United States Patent [19]

Martin

[11] Patent Number: 6,032,775
[45] Date of Patent: Mar. 7, 2000

[54] FLUID FRICTION CLUTCH

[75] Inventor: Hans Martin, Stuttgart, Germany

[73] Assignee: Behr GmbH & Co., Stuttgart, Germany

[21] Appl. No.: 09/161,461

[22] Filed: Sep. 28, 1998

[30] Foreign Application Priority Data

Sep. 27, 1997 [DE] Germany .......................... 197 42 823

[51] Int. Cl.[7] .............................. F16D 35/00; F16D 43/25
[52] U.S. Cl. ................. 192/58.61; 192/58.8; 192/113.21
[58] Field of Search ............................. 192/58.61, 58.63, 192/58.7, 58.8, 113.21, 84.31

[56] References Cited

U.S. PATENT DOCUMENTS

| | | | |
|---|---|---|---|
| 3,262,528 | 7/1966 | Weir | 192/58.63 X |
| 3,893,555 | 7/1975 | Elmer . | |
| 4,046,239 | 9/1977 | Tinholt | 192/58.7 X |
| 4,281,750 | 8/1981 | Clancey | 192/58.7 X |
| 4,305,491 | 12/1981 | Rohrer . | |
| 4,351,426 | 9/1982 | Bopp . | |
| 4,355,709 | 10/1982 | Light . | |
| 4,564,093 | 1/1986 | Storz . | |
| 4,850,465 | 7/1989 | Ono . | |
| 4,898,266 | 2/1990 | Garrett et al. | 192/58.61 X |
| 5,555,963 | 9/1996 | Martin | 192/58.61 |
| 5,701,985 | 12/1997 | Martin | 192/58.8 X |

FOREIGN PATENT DOCUMENTS

| | | |
|---|---|---|
| 0055854 A1 | 12/1981 | European Pat. Off. . |
| 2 414 017 | 12/1974 | Germany . |
| 3109724 A1 | 2/1982 | Germany . |
| 3226634 C4 | 1/1984 | Germany . |
| 4344085 A1 | 6/1995 | Germany . |

Primary Examiner—Rodney H. Bonck
Attorney, Agent, or Firm—Foley & Lardner

[57] ABSTRACT

A fluid friction clutch which assigns the supply chamber to the primary disk connected to the drive shaft, so that the centrifugal forces acting on the oil are determined by the drive speed and not by the clutch housing speed. The inflow and outflow, to and from the working chamber, are controlled via an electromagnet arrangement, in the end positions, to allow the inflow orifice to remain closed when the return flow line is open, and vice versa.

15 Claims, 2 Drawing Sheets

FLUID FRICTION CLUTCH

BACKGROUND OF THE INVENTION

The invention relates to a fluid friction clutch having a driven primary disk which rotates in an oil-fillable working chamber of a housing that serves as a secondary part. A supply chamber for the oil is provided, and a recycle or pumpback system for returning the oil to the supply chamber is provided in the radially outer region of the working chamber. The recycle system includes a valve arrangement for electrically controlling the throughflow from the supply chamber to the working chamber.

A fluid friction clutch of this general type is known to one skilled in the art from DE 43 44 085 A1. In this known design, the supply chamber is provided within an insert part on the side of the clutch housing located opposite the flange connecting the clutch to the engine shaft. In the supply chamber, an electromagnet is arranged and supported relative to the clutch housing via a bearing. This electromagnet is held non-rotatably during operation and acts on a valve lever which opens a throughflow orifice to the supply chamber and a working chamber located behind a partition. In this case, the working chamber is provided in the outer region with profiling in the form of concentric annular projections which utilize corresponding annular ribs of the primary disk. In this way, the shearing forces acting between the primary disk and clutch housing can be increased, depending on the degree of filling the working chamber. In the radially outermost region, the working chamber contains a return bore which, as a rule, works in conjunction with a baffle which opens into a return duct leading back radially to the supply chamber. By means of this recycle or pumpback system, the oil is conveyed out of the working chamber and back in the supply chamber. As a result, the degree of filling in the working chamber can be determined by means of the electromagnet and the valve lever controlled by the latter. The primary disk is seated fixedly in terms of rotation on a drive shaft stub. Accordingly, the primary disk is connected directly to the engine shaft. The clutch housing is conventionally assigned fan blades which work in conjunction with a radiator for the engine coolant. The rotational speed of the fan can be controlled via the electromagnet, as a function of various parameters.

In this case, with the exception of the possibility for electric control from outside, the functioning of such a fluid friction clutch corresponds to the mode of operation of known bimetal-controlled visco fan clutches (DE 3 226 634 C1). In this case, the regulated valve controls the filling of the working chamber from the supply chamber, and the necessary pressure drop results from the centrifugal force occurring due to the rotation of the supply chamber which rotates together with the clutch housing. In such designs, the filling of the working chamber depends strongly on the rotational speed of the clutch housing, which corresponds to the fan speed. Therefore, low fan speeds, such as are provided in accordance with the requirement for a low fan idling speed (approximately 200 revolutions per minute), may last up to several minutes, until an appreciable rise in the fan speed occurs as a result of the filling of the working chamber.

In the known designs, oil is continuously conveyed out of the working chamber into the supply chamber by the baffle, and at all the stable operating points between fan idling and the fan being fully cut in, the oil quantity (regulated by the valve) flowing to the working chamber corresponds to the quantity conveyed back. In this case, the differential pressure generated by the baffle is dependent on the rotational speed difference between the driven primary disk and the clutch housing containing the fan blades. In other words, the differential pressure generated by the baffle is dependent on the slip speed. If the fan speed is lowered, the level of oil in the working chamber is reduced by means of more pronounced throttling, as a rule. At very low slip (differential) speed values (lower than 50 revolutions per minute, corresponding to full cut in at medium drive speeds), the effect of the baffle pump is minimal. As a result, several minutes may elapse until an appreciable reduction in the fan speed occurs. The dynamic behavior of the known types of fluid friction clutches is therefore characterized by dead times or lag times.

At low fan speeds, the pressure at the valve bore is very low, and only slight filling takes place. Since a differential speed is constantly present, more oil is pumped away than can flow in. This has the result that the clutch can no longer cut in.

SUMMARY OF THE INVENTION

Therefore, one object of the present invention is to provide an improved fluid friction clutch without any appreciable outlay in control equipment but nevertheless which is capable of producing a more rapid response by the fan.

A further object of the invention is to assign the supply chamber to the primary disk connected to the drive shaft, which results in the drive speed determining the centrifugal forces acting on the oil. A still further object of the invention is to have the inflow and outflow of the working chamber controlled by an electromagnet arrangement in such a manner that the inflow orifice remains closed when the return flow line is open, and vice versa.

Still another objective of the invention is to provide an improved vehicle containing an improved fluid friction clutch without any appreciable outlay in control equipment but nevertheless which is capable of producing a more rapid response by the fan.

In accomplishing the foregoing objectives, there has been provided according to the present invention a fluid friction clutch comprising a drive shaft; a primary disk seated on the drive shaft for rotation therewith; a housing surrounding the primary disk to form an oil-fillable working chamber a supply chamber for the oil arranged on the primary disk and connected to the working chamber by means of an oil passageway system including at least one inflow passage and at least one return flow passage which extends from a position at least near the circumference of the supply chamber radially outward through the primary disk to the working chamber; and an electrically controlled valve arrangement in the oil passageway system for selectively closing off one of the inflow passage and the return flow passage.

The present invention also provides for a vehicle containing the above fluid friction clutch.

Further objects, features, and advantages of the present invention will become apparent from the detailed description of preferred embodiments that follows, when considered together with the attached figures of drawing.

DETAILED DESCRIPTION OF THE PREFERRED EMBODIMENTS

Figure 1:
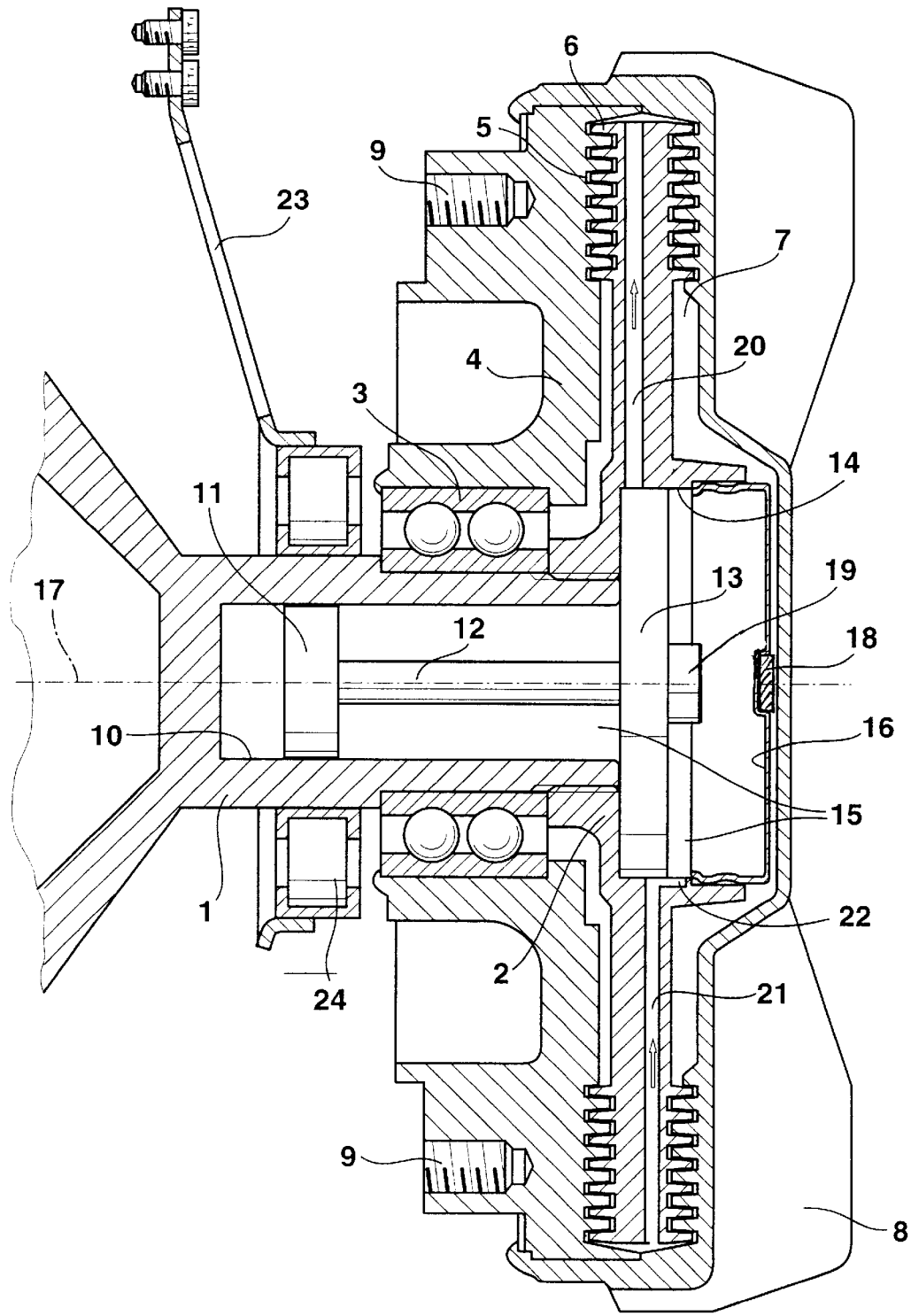
FIG. 1 is a longitudinal section through a first embodiment of a fluid friction clutch according to the invention.

According to the invention, a supply chamber is arranged on the primary disk. The supply chamber is connected to the working chamber via at least one inflow and at least one return flow passage. These two connecting bores or passages branch off from the circumference of the supply chamber and extend through the primary disk radially outward to the working chamber. As a result, the oil quantity to be provided in the working chamber becomes independent of the fan speed and depends only on the drive speed. The supply chamber is accommodated in a space-saving way in the primary disk, which rotates at the drive speed. Consequently, the drive speed determines the pressure drop from the supply chamber into the working chamber. The drive speed also determines the oil flow from the supply chamber into the working chamber via the connecting bore. The oil passes from the working chamber back into the supply chamber with the aid of the recycle or pumpback system, such as a known baffle pump.

Furthermore, the invention provides for opening or closing the inflow line via an electromagnetically actuable control rod. In this case, the return flow line is opened or closed in opposition to the operation of opening or closing the inflow line, resulting in a substantially more rapid response of the clutch.

This control rod advantageously runs coaxially relative to the clutch axis and contains a permanent magnet running in a guide which is surrounded externally by a stationary electromagnet. In this case, in order to avoid magnetic influences, the guide may be produced from a nonmagnetic material. The guide is expediently arranged with the drive shaft, to which the primary disk and the supply chamber are also fixedly connected. Therefore, this fluid friction clutch has a highly effective mode of operation. Additionally, at least part of the supply chamber may be designed as a cylinder guide for a control piston connected to the control rod, with at least the inflow line opening out in the region of this cylinder guide. The inflow line is thereby capable of opening or closing by means of the axial displacement of the control piston.

According to another advantageous development of the invention, the return flow line may open out in the region of the cylinder guide and be provided with an adapted mouth region in the form of an axially-extending recess in the supply chamber wall that is dimensioned in accordance with the axial length of the control piston. The return flow line thus contains a mouth that is offset axially in relation to the mouth of the inflow line, so that the return flow line mouth is thereby opened (depending on of the position of the control piston) when the inflow line is closed, and vice versa.

According to an alternative embodiment of the invention, the control rod may be connected to a valve plate arranged in the supply chamber, and the inflow line opens out axially in the radially outer region of the supply chamber in juxtaposition with the valve plate. Thus, the guidance of a control piston in a cylindrical region may be avoided, resulting in a valve arrangement having a very rapid response due to the lower mass of the control means.

Furthermore, the return flow line may pass through a guide portion for the control rod, the cross section of which is adapted to that of the guide portion. The control rod may also contain a portion of smaller diameter which opens the return flow line only in a position in which the inflow orifice is closed by the valve plate. In a similar way to the advantage described previously, the opening of the inflow bore prevents the oil from flowing back out of the working chamber, resulting in a more rapid response. Thus, the more rapid response becomes possible both during the filling of the working chamber and also during emptying of the latter, because either the inflow or the return flow is blocked in both instances.

The invention is further explained and illustrated in the drawings with reference to two exemplary embodiments. Turning now to the drawings, FIG. 1 shows a drive shaft 1, flanged to the engine shaft in a way not shown in any more detail. It is designed as a hollow shaft and is affixed with a primary disk 2 at its right end. Additionally, a housing 4 surrounds the primary disk 2 and is mounted on the drive shaft 1 via a ballbearing 3. The outer region of the housing 4 is provided with coaxial grooves 5 which form shearing gaps with corresponding projections 6 of the primary disk 2. As a result, the drive force can be transmitted from the shaft 1 to the housing 4, depending on the degree to which the working chamber 7, formed within the housing 4, is filled with oil. The clutch housing 4 contains radially projecting cooling ribs 8 on one side, and on the opposite side, the ribs 8 have bores 9 for fastening fan blades, which are known in the art as part of a fan cooperating with the vehicle radiator (not shown).

The hollow chamber 10 within the drive shaft 1 is designed cylindrically and forms the guide for a permanent magnet 11 which is fixedly connected to a control rod 12 with a control piston 13 at the end facing away from the permanent magnet 11. In this case, the control piston 13 is arranged within the primary disk 2 in a cylindrical guide 14, which forms the supply chamber 15 for the oil and which is closed off by a cap-like cover 16. An iron insert 18 is provided on the cover 16 and is arranged on the axis 17 of the clutch. In conjunction with a permanent magnet 19, the iron insert 18 pulls the control piston 13, in the currentless state, into its right end position, where the latter butts on the edge of the cover 16.

The primary disk 2 contains an inflow bore or passage 20 which is led radially outward from the circumference 14 of the supply chamber 15 and reaches into the radially outermost region of the working chamber 7. This inflow bore 20 opens into the supply chamber 15 in the region of the guide 14, and in the illustrated position of the control piston 13, the inflow bore 20 is closed by the latter.

The primary disk 2 also contains a return flow bore or passage 21 which opens radially into the supply chamber 15 and extends from the radially outermost region of the working chamber 7. It is operatively connected to the working chamber in a way not shown in detail, for example, to a baffle which forms a recycle or pumpback system with the return flow bore 21. The return flow passage 21 opens out in the region of the guide 14, but is preferably somewhat offset axially, in a recess 22 which projects in the axial direction, beyond the control piston 13 as illustrated. Therefore, the return flow line 21 is opened to the supply chamber 15, whereas the inflow line 20 is closed, in the position shown.

The drive shaft 1 is surrounded by an electromagnet 24, which is fastened in a stationary manner by means of a holding device 23 and which serves for the axial displacement of the permanent magnet 11 together with the control rod 12. For this purpose, the drive shaft 1 is produced from a nonmagnetic material, such as austenitic steel.

When the electromagnet 24 is energized, the control rod 12 and control piston are in the position shown. In this case, the inflow bore 20 is closed and the oil present in the supply chamber 15 is conveyed out of the working chamber 7 back through the return flow bore 21. The supply chamber 15 is connected to the cylindrical guide space 10 in the drive shaft 1 by means of orifices, not shown in detail, in the control piston 13. When the electromagnet 24 is not energized, the return flow bore 21 is shut off completely by the control piston 13, which is displaced to the right until it butts on the cover 16, allowing the filling of the working chamber 7 to proceed very quickly since there is then no return flow out of the working chamber 7 into the supply chamber 15. The axial length of the recess 22 is therefore designed in such a way that it is completely covered by the control piston 13 when the inflow bore 20 is fully open (the piston 13 butts on the cover 16).

The fluid friction clutch of FIG. 1 is distinguished by rapid response. This is true not only in filling the working chamber 7, but also in the case of the emptying the latter, since in this case, as the position of FIG. 1 shows, the inflow bore 20 is closed, whereas the return flow bore 21 is opened. When the current is shut off, the piston 13 is brought into its right end position. The present fluid friction clutch is therefore "fail-safe". Furthermore, as shown later in FIG. 2, instead of resetting by means of the permanent magnet 19, a compression spring arranged on the left of the permanent magnet 11 could also be provided.

Figure 2:
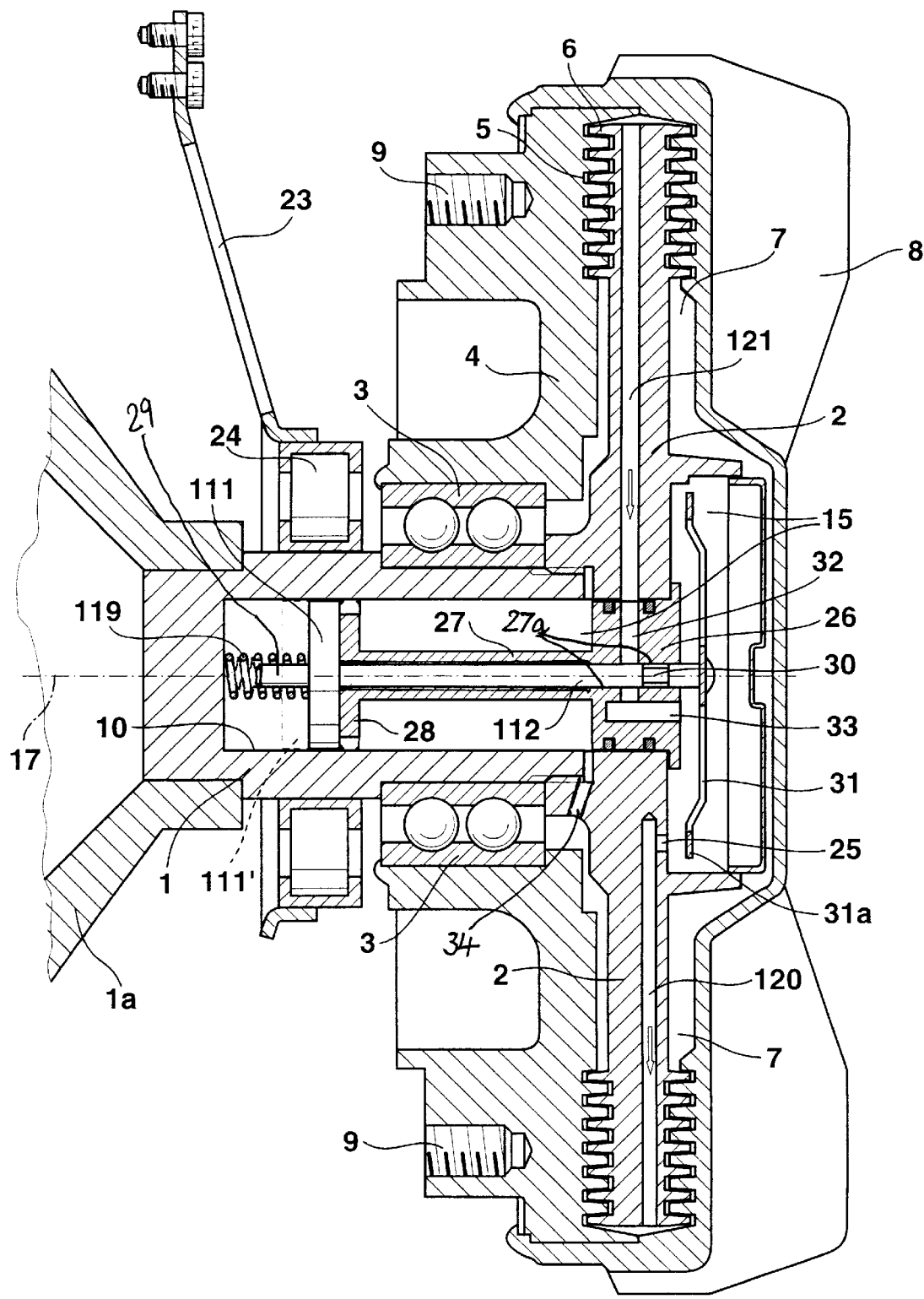
FIG. 2 is a longitudinal section through a second embodiment of a fluid friction clutch.

FIG. 2 shows a fluid friction clutch of a similar type as described above in connection with FIG. 1. The difference in FIG. 2 is the method of controlling the inflow and return flow to and from the working chamber 7. In FIG. 2, the primary disk 2 contains a return flow bore 121 and an inflow bore 120 which extend within the primary disk 2 radially to the outermost region of the working chamber 7. However, the inflow bore 120 does not open radially into the supply chamber 15, but is closed at its end facing the axis 17. Instead, it opens into the supply chamber 15 via an axially running bore portion 25. The return flow line 121 opens out radially, on the inner circumference of the primary disk 2, in a guide insert 26 which is inserted into the bore 10 open to the supply chamber 15. The guide insert 26 is provided with a guide 27 which runs coaxially relative to the axis 17 of the clutch and runs through the bore 10. It is supported, at its end facing away from the guide insert 26, by a stop 28 in the bore 10. A control rod 112 is guided within the guide insert 26 and the guide 27. At its left end, the control rod 112 contains a permanent magnet 111 and an extension 29, which serves as a guide for a helical spring 119 which is supported, on the one hand, on the permanent magnet 111 and, on the other hand, on the closed end of the bore 10.

The control rod 112 is expediently designed cylindrically and possesses a portion 30 of smaller diameter. The control rod 112 carries a valve disk 31 at the end facing away from the permanent magnet 111, the radially outer part 31a of which is located opposite the bore portion 25.

Moreover, FIG. 2 shows that the return flow bore 121 opens into a bore 32 which passes radially through that part 27a of the guide 27 located within the guide insert 26 and which opens into a portion 33 which leads axially into the supply chamber 15. The cross section of the part 27a of the guide 27 must be dimensioned in such a way that the control rod 112 is guided in a sealed manner in this region.

Therefore, in the illustrated extended position of the permanent magnet 111, the return flow bore 121 is shut off by the control rod 112, while the inflow bore 120 is fully opened.

Additionally, when the electromagnet 24 is actuated, as shown in FIG. 1, the permanent magnet 111 is displaced axially to the left, into its position 111', represented by broken lines. In this position, the portion 30 is located in front of the bore 32, and the portion 31a of the valve plate 31 closes the bore portion 25. Thus, the return flow line 121 is fully opened, whereas the inflow bore 120 is closed and consequently, working chamber 7 empties very rapidly. In contrast, when the permanent magnet 111 is in the position shown by unbroken lines, working chamber 7 fills very rapidly, since there is no return flow out of the working chamber 7. By appropriately timing the electromagnet and the corresponding open/shut action on the inflow and outflow bores, the inflow and outflow of oil to and from the working chamber can be regulated in the desired way. It should be noted that, during the return stroke of the permanent magnet 111 into its position represented by unbroken lines, oil located within the hollow chamber 10 can be displaced into the working chamber 7 through a connecting orifice 34. Therefore, this fluid friction clutch has a highly effective mode of operation.

Priority application German 197 42 823.1, filed Sep. 27, 1997, including the specification, drawings, claims and abstract, is hereby incorporated by reference.

The invention has been described with reference to certain preferred embodiments. Many modification and/or alternative arrangements to these preferred embodiments will become apparent to the skilled artisan. It is contemplated that and such revisions and/or equivalent structures shall be covered by the appended claims.

What is claimed is:

1. A fluid friction clutch comprising:
   a drive shaft;
   a primary disk seated on the drive shaft for rotation therewith;
   a housing surrounding the primary disk to form an oil-fillable working chamber;
   a supply chamber for said oil arranged on said primary disk and connected to said working chamber by means of an oil passageway system including at least one inflow passage and at least one return flow passage which extends from a position at least near the circumference of the supply chamber radially outward through the primary disk to the working chamber; and
   an electrically controlled valve arrangement in the oil passageway system for selectively closing off one of the inflow passage and the return flow passage,
   wherein the valve arrangement comprises an electromagnetically actuable control rod for selectively closing at least one of the inflow passage and the return flow passage, and
   wherein the control rod is arranged such that the return flow passage is opened or closed in opposition to the inflow passage.

2. A fluid friction clutch as claimed in claim 1, wherein the control rod runs coaxially to the clutch axis and comprises a guide structure, a permanent magnet running in the guide structure, and a stationary electromagnet externally surrounding the permanent magnet.

3. A fluid friction clutch as claimed in claim 2, wherein the guide structure comprises a nonmagnetic material.

4. A fluid friction clutch as claimed in claim 3, wherein the primary disk and supply chamber are fastened to the guide structure and the guide structure is within the drive shaft.

5. A fluid friction clutch as claimed in claim 2, wherein at least part of the supply chamber acts as a cylinder guide for a control piston connected to the control rod, and wherein the inflow passage opens out in the region of the cylinder guide.

6. A fluid friction clutch as claimed in claim 5, wherein the return flow line opens out in the region of the cylinder guide and is connected to a mouth region in the form of an axially-extending recess in the supply chamber wall, said recess having an axial length corresponding to the axial dimension of the control piston.

7. A fluid friction clutch as claimed in claim 2, further comprising a valve disk arranged in the supply chamber connected to the control rod and wherein the inflow passage opens out axially in the outer region of the supply chamber in juxtaposition with the valve disk.

8. A fluid friction clutch as claimed in claim 7, wherein the guide structure comprises a guide member positioned within the drive shaft, and wherein the return flow passage passes through the guide member for the control rod, wherein the cross section of the control rod is adapted to the internal cross section of the guide member, and wherein the control rod includes a portion of smaller diameter which serves to open the return flow passageway when the control rod moves axially to a position in which the valve disk closes the inflow passageway.

9. A fluid friction clutch as claimed in claim 7, further comprising a hollow chamber within the drive shaft for containing oil and a connecting orifice for displacing said oil contained in said oil chamber into the working chamber in response to the return stoke of the permanent magnet or spring.

10. A fluid friction clutch as claimed in claim 1, wherein the clutch housing contains radially projecting cooling ribs on one side, and on the opposite side, the ribs contain bores for fastening fan blades.

11. A fluid friction clutch as claimed in claim 1, wherein the outer region of the housing is provided with coaxial grooves which form shearing gaps with corresponding projections of the primary disk.

12. The fluid friction clutch of claim 1, further comprising means for returning the control rod to a "fail safe" position.

13. The fluid friction clutch of claim 12, wherein the return means comprises a compression spring.

14. The fluid friction clutch of claim 12, wherein the return means comprises a permanent magnet.

15. A vehicle containing a fluid friction clutch comprising:

a drive shaft;

a primary disk seated on the drive shaft for rotation therewith;

a housing surrounding the primary disk to form an oil-fillable working chamber;

a supply chamber for said oil arranged on said primary disk and connected to said working chamber by means of an oil passageway system including at least one inflow passage and at least one return flow passage which extends from a position at least near the circumference of the supply chamber radially outward through the primary disk to the working chamber; and an electrically controlled valve arrangement in the oil passageway system for selectively closing off one of the inflow passage and the return flow passage, wherein the valve arrangement comprises an electromagnetically actuable control rod for selectively closing at least one of the inflow passage and the return flow passage, and wherein the control rod is arranged such that the return flow passage is opened or closed in opposition to the inflow passage.

* * * * *